(12) United States Patent
Inamoto (10) Patent No.: US 7,244,032 B2
(45) Date of Patent: Jul. 17, 2007

(54) PROJECTOR

(75) Inventor: Masayuki Inamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 314 days.

(21) Appl. No.: 10/854,286

(22) Filed: May 27, 2004

(65) Prior Publication Data

US 2004/0239889 A1 Dec. 2, 2004

(30) Foreign Application Priority Data

May 28, 2003 (JP) ............................. 2003-151324

(51) Int. Cl.
*G03B 21/26* (2006.01)
(52) U.S. Cl. .............................. 353/94; 353/30; 353/85
(58) Field of Classification Search .................. 353/31, 353/94, 85, 29, 30
See application file for complete search history.

(56) References Cited

U.S. PATENT DOCUMENTS 4,011,403 A * 3/1977 Epstein et al. ............... 348/370
4,170,397 A * 10/1979 Botcherby et al. .......... 359/210
6,317,169 B1 11/2001 Smith
6,561,654 B2 * 5/2003 Mukawa et al. ............. 353/31
6,594,090 B2 * 7/2003 Kruschwitz et al. ........ 359/707
2004/0196443 A1 * 10/2004 Tomita et al. ................ 353/94

FOREIGN PATENT DOCUMENTS

JP 2001-148345 5/2001

* cited by examiner

*Primary Examiner*—Rodney Fuller
*Assistant Examiner*—Robert Do
(74) *Attorney, Agent, or Firm*—Arnold International; Bruce Y. Arnold (57) ABSTRACT

A liquid crystal projector for full-color image projection has three LCD panels as light valve device, associated with respectively primary colors, for displaying an image in a color-separated manner. An ultra high pressure mercury lamp illuminates the LCD panels through three illuminating light paths associated with respectively the primary colors. A combining prism combines image light of the primary colors from the three LCD panels, to obtain full-color image light. A laser diode emanates auxiliary illuminating light of a red color among the primary colors according to laser emission, to compensate for shortage in light intensity in the red color. A ferroelectric shaking or vibrating device vibrates the laser diode, to keep visual noise inconspicuous in the auxiliary illuminating light.

13 Claims, 7 Drawing Sheets

PROJECTOR

BACKGROUND OF THE INVENTION

1. Field of the Invention

The present invention relates to a projector. More particularly, the present invention relates to a projector for image projection in a full-color manner, and capable of effectively compensating for unbalancing of colors by use of auxiliary illuminating light.

2. Description Related to the Prior Art

A liquid crystal projector is known as an image display device. The liquid crystal projector of a full-color type includes plural liquid crystal display panels (LCD panels), which optically modulate light so as to project image light to a screen for displaying an image. Two types of the liquid crystal projector are known. A first of those is a front type in which an image is projected to a front side of the screen in a direction toward the rear. The second of the methods is a rear type in which an image is projected to a rear side of the screen in a direction toward the front. Also, there are plural illuminating methods different from one another according to a transmission type or reflection type of the LCD panels to be used. In any of them, the LCD panels are driven to indicate an object image, which is illuminated with illuminating light. Image light is projected by a projecting lens to a screen in a focused state.

The LCD panels in the liquid crystal projector are three panels for blue, green and red colors. For the illuminating light from a light source in the liquid crystal projector, dichroic mirrors are used for color separation. The illuminating light from the light source is separated into components of the blue, green and red colors, which are applied to corresponding ones of the LCD panels. For the respective channels of the primary colors, the light is optically modulated by the LCD panels, and is combined by a combining optical system such as a prism, to project a full-color image to a screen.

Figure 7:
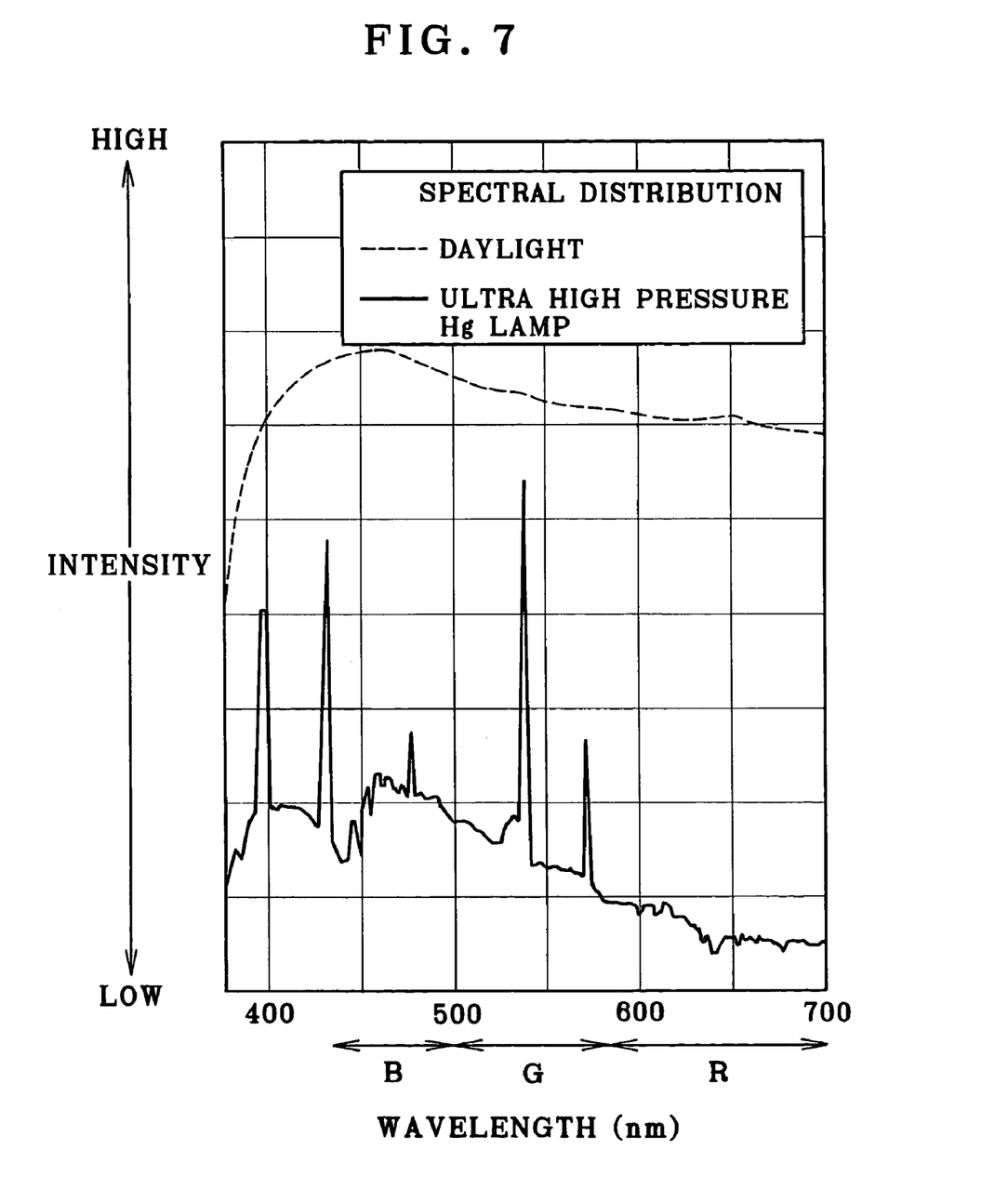
FIG. 7 is a graph illustrating spectral distribution of daylight and light of the ultra high pressure mercury lamp.

A light source for use in the liquid crystal projector should have well-balanced color components of primary colors. However, an ultra high pressure mercury lamp generally used in the liquid crystal projector does not have a good balance between color components. See FIG. 7. Although the color of daylight or solar light is sufficient white light, the color of the light of the ultra high pressure mercury lamp has higher levels in the blue and green components. A light amount of the red component of the light of the light source is smaller to an amount of a remarkable shortage. Also, a further difference occurs. The illuminating light is separated into the components of the primary colors, before the components are combined by a combining prism to obtain the image light. In this process after the light separation, there occur deficits in the light amount of the components. However, there are differences in the deficit between the primary colors.

In the travel of the illuminating light from the light source in the liquid crystal projector, a balanced state between the color components in the image light comes to have a lower quality, to lower the image quality of the projection. It is required to correct the color balance of the components.

Techniques of laser have been used widely in various fields. A laser medium is supplied with energy to emanate laser light. A wavelength or color of the laser light is peculiar to and depends upon a characteristic of the laser medium. Also, a laser diode is very useful as laser medium because of a small size of a semiconductor. It is conceived to use laser as the illuminating light.

However, there arises a problem derived from a characteristic of laser. Illumination of laser light is influence by coherency of the laser, to create noise called speckles in an illuminating region. When laser is used as light surface in the liquid crystal projector, flickering is likely to occur in a displayed image. Furthermore, black spots may occur in the displayed image, to lower the image quality.

JP-A 2001-148345 discloses an optical instrument for illumination, in which a mirror is shaken or oscillated in a light path from a laser light source to an object, for the purpose of virtually removing unwanted influence caused by coherency of laser light. U.S. Pat. No. 6,317,169 (corresponding to JP-A 2002-543455) discloses a display in which an image itself is shaken or oscillated to a small section.

However, the structures according to the prior document have a problem in an enlarged size of the shaking device because of a great size of a vibrating element. If the image to be displayed is shaken itself, the image quality will be low.

SUMMARY OF THE INVENTION

In view of the foregoing problems, an object of the present invention is to provide a projector for image projection in a full-color manner, and capable of effectively compensating for unbalancing of colors by use of only a simple structure.

In order to achieve the above and other objects and advantages of this invention, a projector for full-color image projection is provided, and includes a light valve device, associated with color components of plural colors, for displaying an image in a color-separated manner. A main illuminating device illuminates the light valve device with main illuminating light of the plural colors through illuminating light paths associated with respectively the color components, wherein image light of the plural colors is output by the light valve device, to constitute full-color image light. A laser illuminating device emanates auxiliary illuminating light of at least one specific color among the plural colors according to laser emission through one of the illuminating light paths for the specific color, so as to compensate for shortage in light intensity in the main illuminating light. A shaking device shakes the laser illuminating device, so as to keep visual noise inconspicuous in the auxiliary illuminating light.

The laser illuminating device includes a laser light source for generating laser light. A laser optical system regularizes the laser light from the laser light source, to output the auxiliary illuminating light.

Furthermore, an auxiliary combining optical element receives and combines the main illuminating light of the specific color and the auxiliary illuminating light from the laser illuminating device, and directs the light being combined to the illuminating light path for the specific color.

The shaking device includes a vibrating element secured to the laser illuminating device. A vibrating circuit applies voltage to the vibrating element, so as to vibrate the laser illuminating device.

The light valve device includes plural liquid crystal display panels. Furthermore, a combining optical system combines the image light of the plural colors from the liquid crystal display panels, to obtain the full-color image light.

The shaking device vibrates the laser light source.

The laser light source includes a laser diode. Furthermore, a laser diode holder has the shaking device secured thereto, for supporting the laser diode therein.

In one preferred embodiment, the shaking device vibrates the laser optical system.

The laser optical system includes a condensing lens condenses the laser light from the laser light source. An optical integrator regularizes the laser light from the condensing lens, to obtain light flux. A relay lens receives the light flux incident thereon from the optical integrator, and adjusts an illuminating region thereof, to obtain the auxiliary illuminating light.

The shaking device vibrates the relay lens.

In another preferred embodiment, furthermore, a light path holder contains the laser light source and the laser optical system, wherein the shaking device vibrates the light path holder.

The auxiliary combining optical element has wavelength selectivity, reflects the illuminating light of the specific color, and allows passage of the auxiliary illuminating light.

The vibrating element is ferroelectric.

The vibrating element is produced from material containing at least one of lead titanate and lead zirconate.

The main illuminating device includes an ultra high pressure mercury lamp, and the specific color is red.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
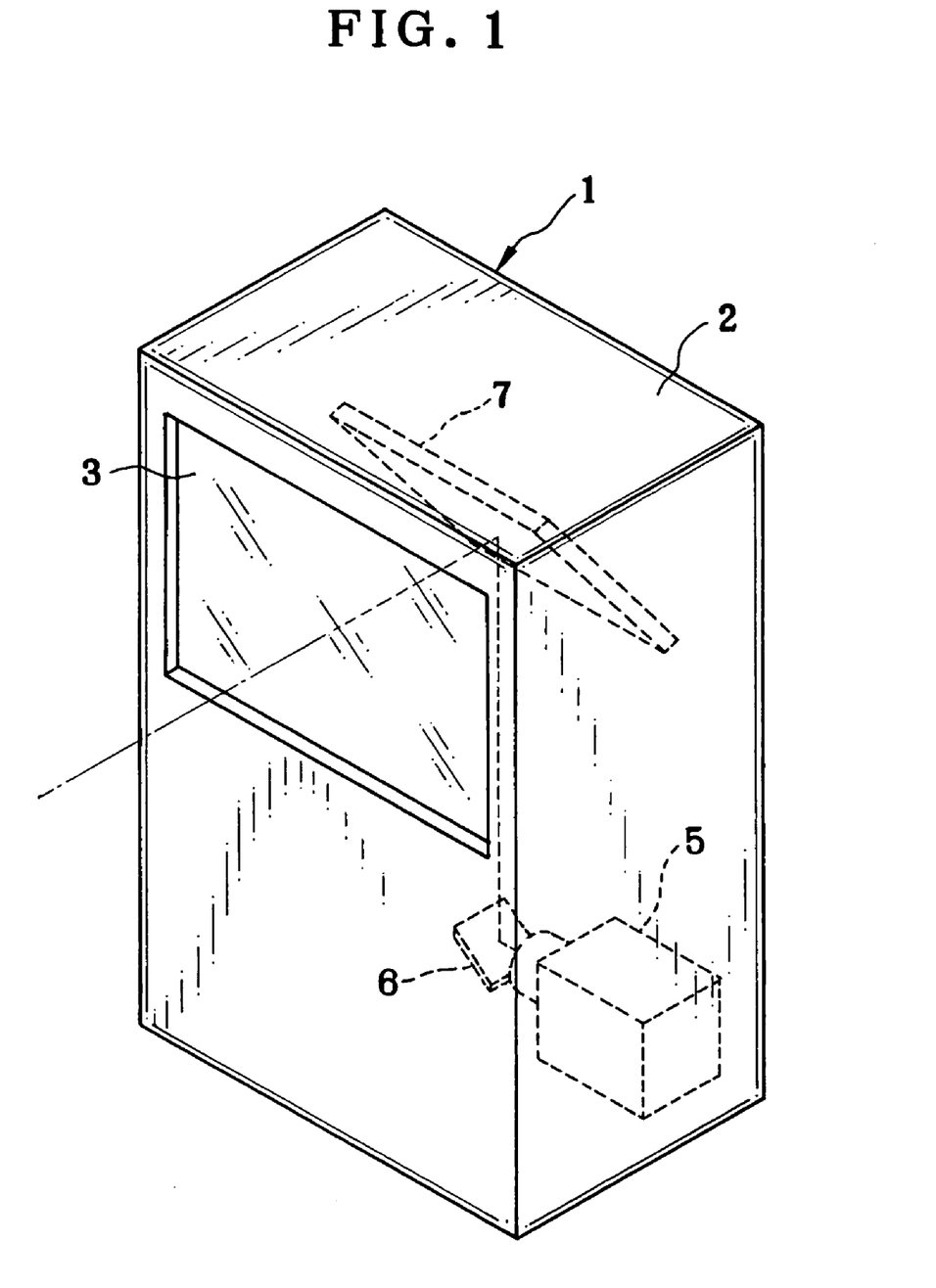
FIG. 1 is a perspective illustrating a liquid crystal projector of a rear type.

In FIG. 1, a liquid crystal projector 1 is illustrated. This is referred to also as a projection type of display device, and specifically a rear type. A projector body 2 has a front panel, in which a screen 3 of a transparent diffusion type is fixed. An image is projected on the rear of the screen 3, and is observed from the front of the screen 3. A projecting unit 5 is contained in the projector body 2. Mirrors 6 and 7 reflect image light from the projecting unit 5 toward the rear of the screen 3, where the image light is focused. In the liquid crystal projector 1, a tuner circuit and other well-known circuits or units are disposed for reproducing a video signal and acoustic signal. Liquid crystal display panels in the projecting unit 5 display a reproduced image according to the video signal. Thus, it is possible to use the liquid crystal projector 1 in a form of a television set of a large frame size.

Figure 2:
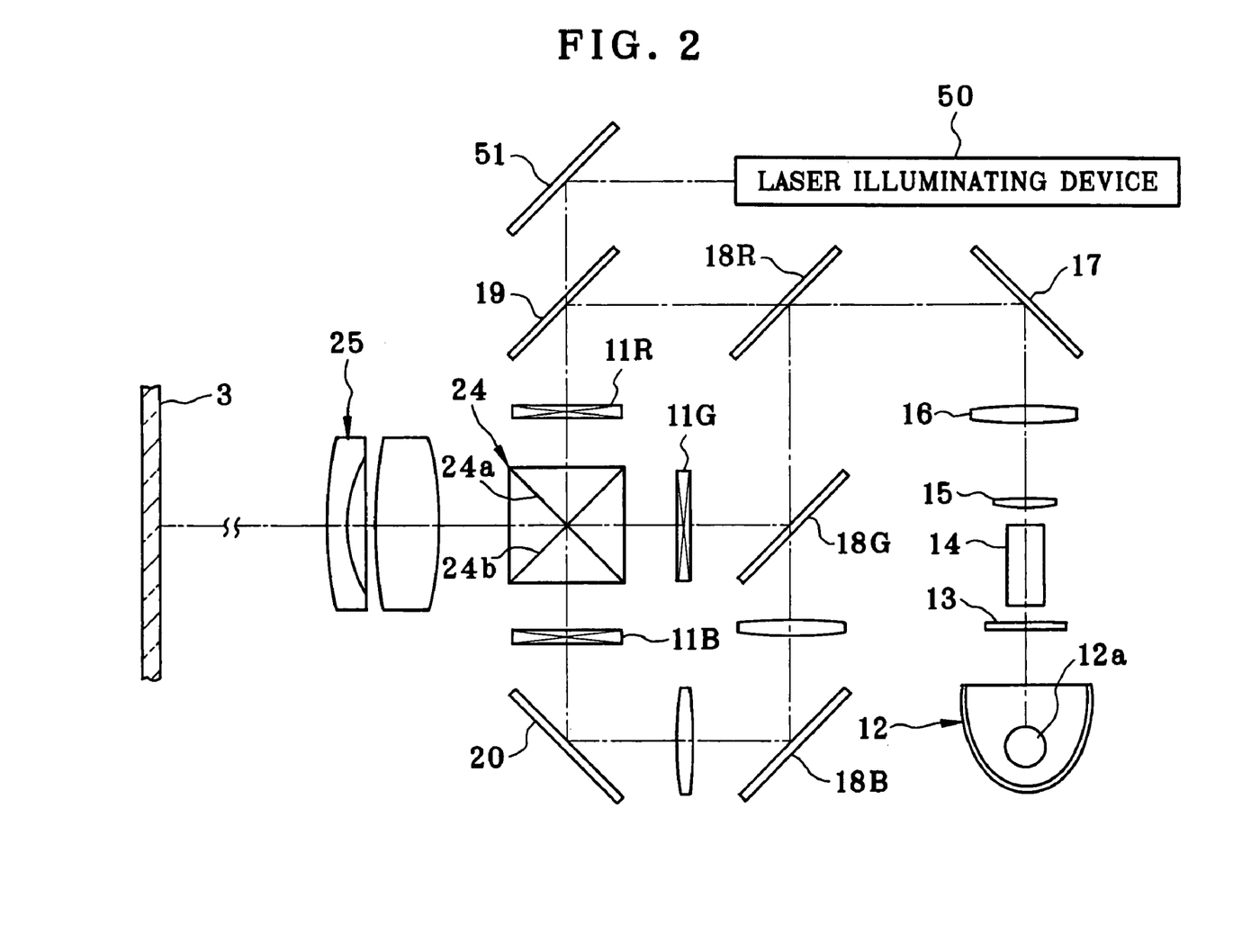
FIG. 2 is an explanatory view illustrating a projecting unit having liquid crystal display panels.

In FIG. 2, arrangement of the projecting unit 5 is schematically illustrated. Three liquid crystal display panels (LCD panels) 11R, 11G and 11B of a transmission type are incoroprated in the projecting unit 5 for projection of a full-color image. A main illuminating device 12 is incorporated in the projecting unit 5. An ultra high pressure mercury lamp 12a is included in the main illuminating device 12, and emanates light with a spectral distribution illustrated in FIG. 4.

The main illuminating device 12 emanates white light having components of red, green and blue colors. A UV-IR cut filter 13 and a glass rod 14 are disposed on a light path extending from the main illuminating device 12. The UV-IR cut filter 13 is positioned to cut ultraviolet and infrared components from the white light. The glass rod 14 transmits the light from the UV-IR cut filter 13 toward the liquid crystal display panels. An incident surface of the glass rod 14 is positioned near to a second focal point of an ellipse of the shape of a reflector of the main illuminating device 12. Light from the main illuminating device 12, therefore, comes incident upon the glass rod 14 with high efficiency.

Relay lens groups 15 and 16 are incorporated in such a manner as to set an exit surface of the glass rod 14 optically conjugate with an illuminated surface of the LCD panels 11R, 11G and 11B. The relay lens groups 15 and 16 uniformize the illuminating light, and restrict a region of illuminating to a predetermined size on the illuminating surface. A mirror 17 reflects the light exited from the relay lens groups 15 and 16. Among color components of the reflected light, a dichroic mirror 18R allows a red light component to pass, but reflects green and blue light components, thus splits the reflected light into two light fluxes. A combining mirror 19 reflects the red light component, which illuminates the rear of the LCD panel 11R.

Among color components of the light reflected by the dichroic mirror 18R, a dichroic mirror 18G allows the blue light component to pass, but reflects the green light component, thus splits the incident light into two light fluxes. The green light from the dichroic mirror 18G illuminates the rear of the LCD panel 11G. Mirrors 18B and 20 are positioned for the blue light passed through the dichroic mirror 18G. The blue light is reflected, and illuminates the rear of the LCD panel 11B.

Each of the LCD panels 11R, 11G and 11B is constituted by a TFT (thin-film transistor) liquid crystal device, and displays a predetermined one of red, green and blue images. A combining prism 24 as combining optical system is disposed so that its center is positioned optically equidistant from the LCD panels 11R, 11G and 11B. There is a projecting lens 25 opposed to an exit surface of the combining prism 24. Two dichroic surfaces 24a and 24b are disposed on the inside of the combining prism 24, and combine the red light component from the LCD panel 11R, the green light component from the LCD panel 11G, and the blue light component from the LCD panel 11B. Image light of a full-color form is obtained, and is directed by the combining prism 24 to the projecting lens 25.

A focal plane of the projecting lens 25 on the object side is positioned at the exit surface of the LCD panels 11R, 11G and 11B. A focal plane of the projecting lens 25 on the image side is positioned at the screen 3. Thus, a full-color image formed by combination in the combining prism 24 is focused on the screen 3. Note that the mirrors 6 and 7 of FIG. 1 are omitted from FIG. 2 only for the purpose of simplification, but are still used actually for their purpose.

An auxiliary or laser illuminating device 50 is included in the liquid crystal projector 1, and emanates laser light for a purpose to compensate for shortage in the light amount of a red light component of the main illuminating device 12. The combining mirror 19 is positioned in the light path from the laser illuminating device 50. The combining mirror 19 is a type having wavelength selectivity for allowing passage of a light component only with a predetermined wavelength range according to a wavelength of oscillation of laser light. This is for the purpose of directing light from the laser illuminating device 50 also to the LCD panel 11R. A mirror 51 reflects the illuminating light from the laser illuminating device 50. The light is passed through the combining mirror 19, and incident upon the rear of the LCD panel 11R from the rear to the front.

Figure 3A:
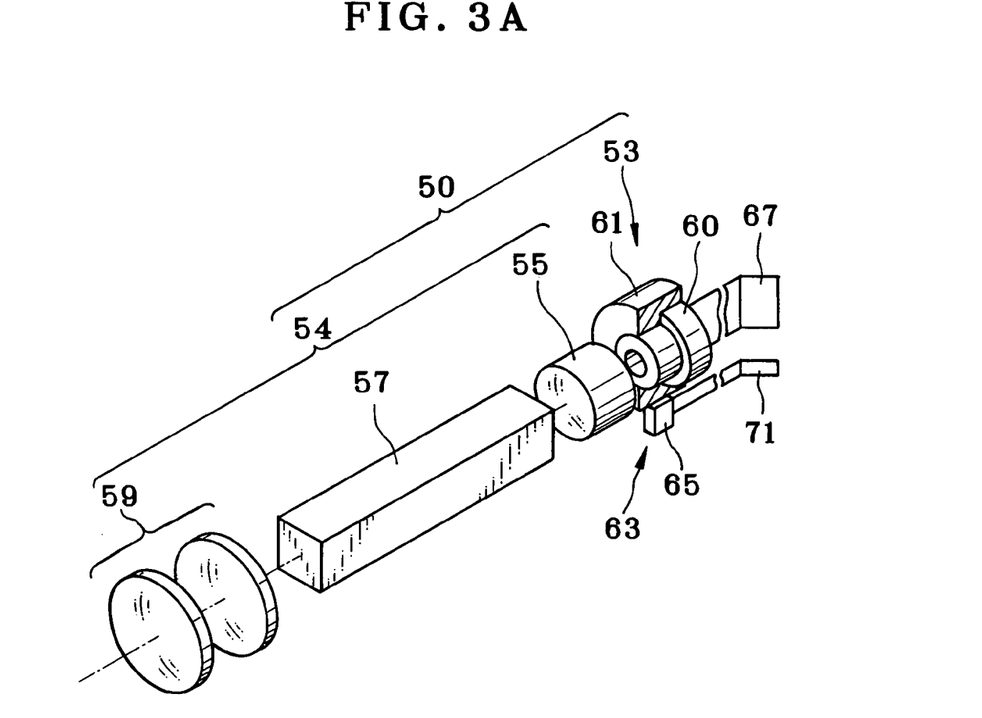
FIG. 3A is an exploded perspective illustrating an auxiliary or laser illuminating device.
Figure 3B:
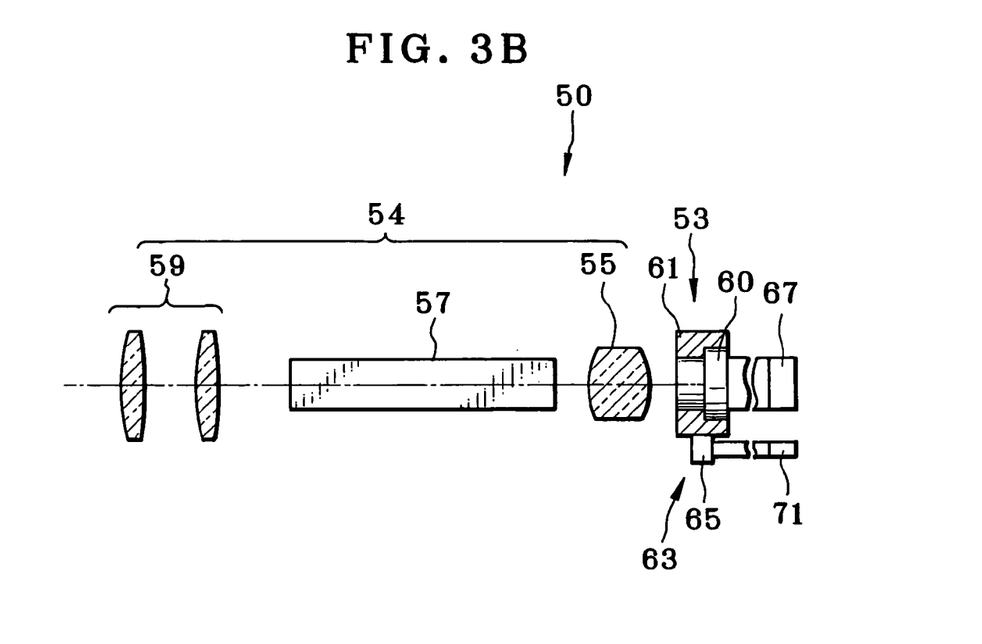
FIG. 3B is a vertical section illustrating the laser illuminating device.

In FIG. 3, the laser illuminating device 50 includes a laser light source 53 and a laser optical system 54 for guiding the laser light in a predetermined region in a regularized manner. The laser optical system 54 includes a condensing lens 55, an optical integrator 57, and a relay lens group 59. The condensing lens 55 refracts the incident light, and condenses the light on an entrance surface of the optical integrator 57. The optical integrator 57 has a tubular shape of a quadrilateral prism, has an inner reflecting surface, regularizes and symmetrizes distribution of intensity of the illuminating light with respect to the exit surface, and shapes the light flux in a form of a rectangular quadrilateral that is geometrically similar to a target surface to be illuminated. The relay lens group 59 refracts the incident light and adjusts the illuminating region of the light.

Figure 4:
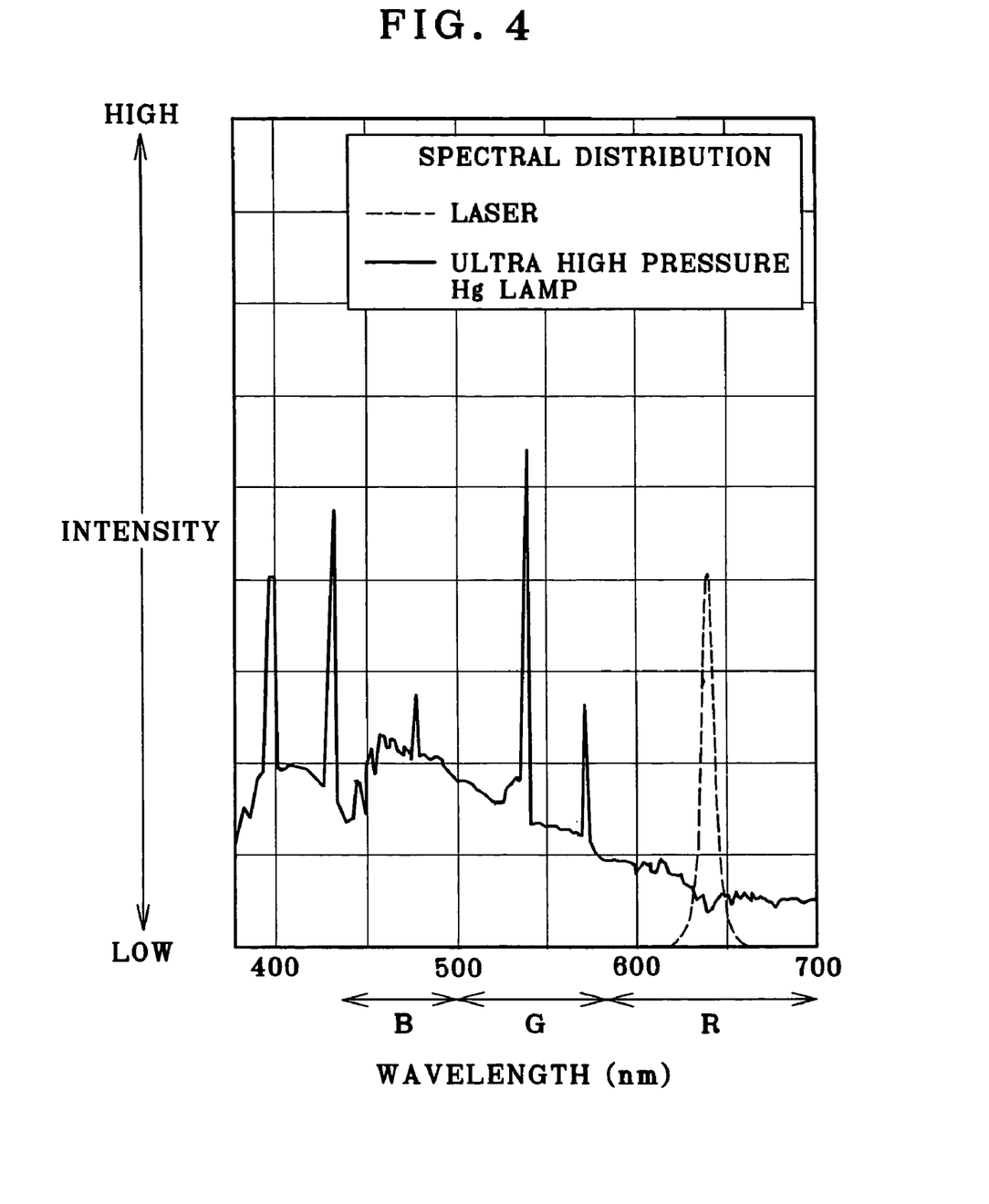
FIG. 4 is a graph illustrating spectral distribution of laser light and light of the ultra high pressure mercury lamp.

The laser light source 53 includes a laser diode 60, a laser diode holder 61, a laser emitting circuit 67, and a shaking device or vibration generator 63. The laser diode 60 is semiconductor laser having a semiconductor as laser medium, and supported on the inside of the laser diode holder 61. In FIG. 4, the laser diode 60 emits laser light of red color of which a peak of the wavelength is set between 600 nm and 700 nm, namely a section where light emission of the ultra high pressure mercury lamp 12a in the main illuminating device 12 is specifically weak according to its spectral distribution. The laser diode 60 is supplied with power by the laser emitting circuit 67, and emits laser light.

The shaking device 63 includes a vibrating element 65 and a vibrating circuit 71. The vibrating element 65 is formed from ferroelectric material, and effects vibration or shake owing to internal distortion upon application of voltage, the distortion being expansion and shrinkage of the material to a small extent. A preferable example of the material is PZT which is a ceramic material obtained by mixture of lead titanate ($PbTiO_3$) and lead zirconate ($PbZrO_3$). The vibrating element 65 is positioned to contact the laser diode holder 61, connected with the vibrating circuit 71, and supplied with voltage to shake or vibrate the laser diode holder 61. Thus, laser light emanated by the laser diode 60 is vibrated.

Due to coherency of laser light, the use of the laser for illumination causes occurrence of speckle noise in an image of the screen 3. In the present invention, however, the laser diode 60 is shaken or vibrated so as to move the speckle noise periodically, to prevent apparent recognition on the screen 3. Note that the frequency of vibration of the shaking device or vibration generator 63 is preferably higher than that defined according to an upper limit of a speed of movement of objects recognizable to human eyes. It is known that human eyes visually recognize objects in a speed range equal to or slower than 30 Hz. So frequency of vibration of the shaking device 63 can be from hundreds of Hz to thousands of Hz, so as to prevent visually apparent recognition of speckle noise on the screen 3.

The operation of the above construction is described now. In displaying an image, the main illuminating device 12 with the laser illuminating device 50 illuminates the LCD panels 11R, 11G and 11B. To this end, illuminating light from the main illuminating device 12 is split by the dichroic mirrors 18R and 18G into fluxes of red, green and blue colors, which are applied to the LCD panels 11R, 11G and 11B from their rear toward the front.

Also, illuminating light from the laser illuminating device 50 illuminates the rear of the LCD panel 11R. The laser diode 60 in the laser illuminating device 50 emits red light with a peak at a wavelength of 639 nm. See FIG. 4. The shaking device or vibration generator 63 provides vibration on the laser diode 60. So the illuminating light from the laser illuminating device 50 vibrates.

The laser light emanated by the laser illuminating device 50 is condensed by passage through the condensing lens 55. The laser light is incident upon the optical integrator 57 of the tubular shape, and becomes symmetrized and suitably shaped by the passage through. Upon exiting from the optical integrator 57, the light becomes incident on the relay lens group 59, which adjusts the illuminating region of the light. This causes the light to illuminate the rear of the LCD panel 11R in an uniformized manner. The illuminating light from the main illuminating device 12 and the laser illuminating device 50 is passed through the LCD panels 11R, 11G and 11B, and then combined by the combining prism 24. Image light is obtained, and projected on to the screen 3.

Consequently, the laser illuminating device 50 in the liquid crystal projector 1 applies additional red light to the LCD panel 11R to compensate for shortage in the red light component of the main illuminating device 12. So the light amounts of the primary colors for illuminating the liquid crystal display panels can be well-balanced. Image quality of the image being displayed can be higher. Furthermore, the use of laser for the auxiliary illumination at the laser illuminating device 50 is advantageous in its small size, which prevents enlargement of the general size of the projector.

The laser light emanated by the laser illuminating device 50 is shaken or vibrated. This makes it possible to shift speckle noise periodically even upon occurrence due to coherency of the laser. Influence of the speckle noise is virtually eliminated, to raise quality of a displayed image. Illuminated light is vibrated without vibrating the image. There is no degradation of the image due to the vibration. Only part of the laser illuminating device 50 is vibrated. Thus, it is possible to reduce the size of a structure for the vibration.

Figure 5A:
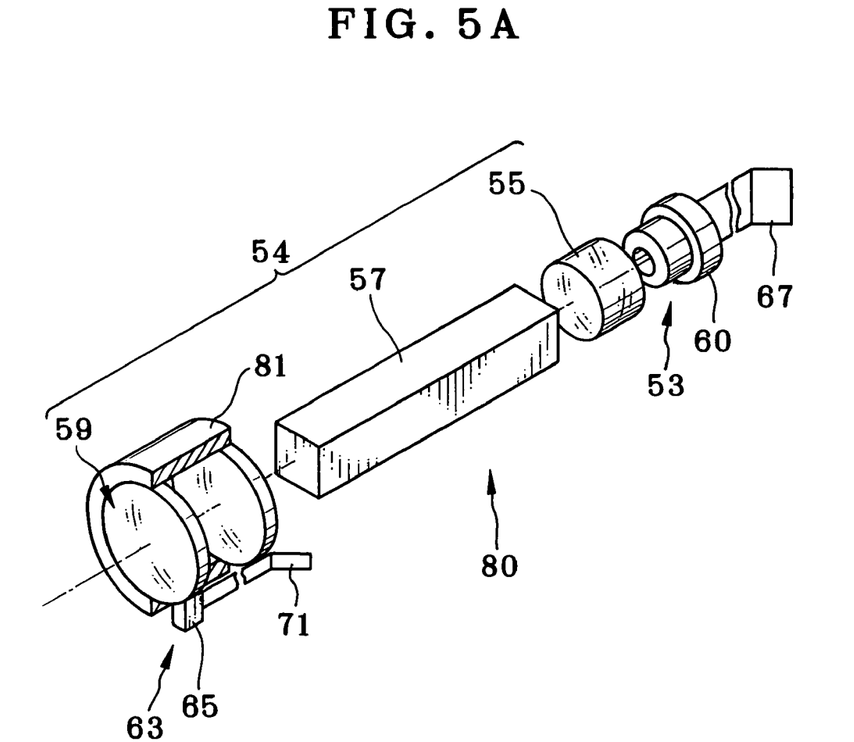
FIGS. 5A and 5B are an exploded perspective and a vertical section illustrating one preferred laser illuminating device of which a relay lens is shaken.
Figure 5B:
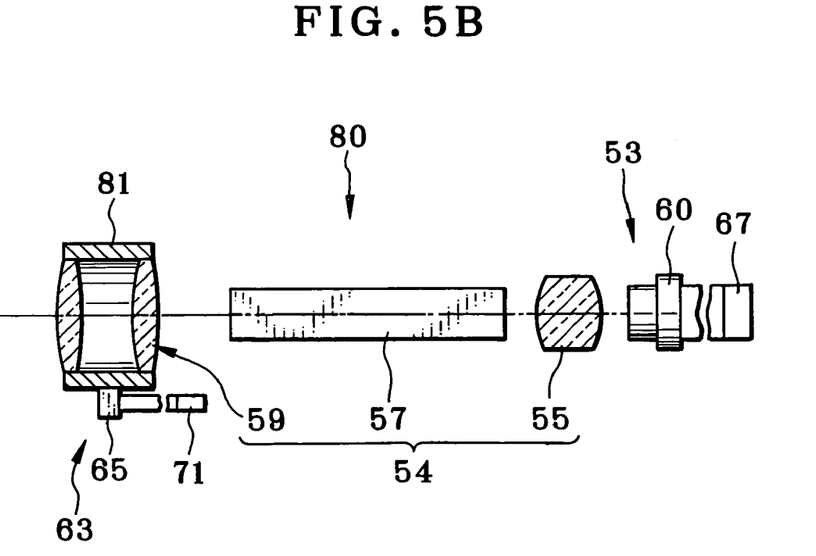

In the above embodiment, the laser diode 60 is shaken in the laser illuminating device 50. However, other relevant elements may be shaken in an auxiliary or laser illuminating device. In FIG. 5, another preferred embodiment is illustrated, in which the relay lens group 59 is movable in an auxiliary or laser illuminating device 80, and the shaking device or vibration generator 63 vibrates the relay lens group 59. A relay lens holder 81 supports the relay lens group 59, and is provided with vibration by the shaking device 63.

Figure 6A:
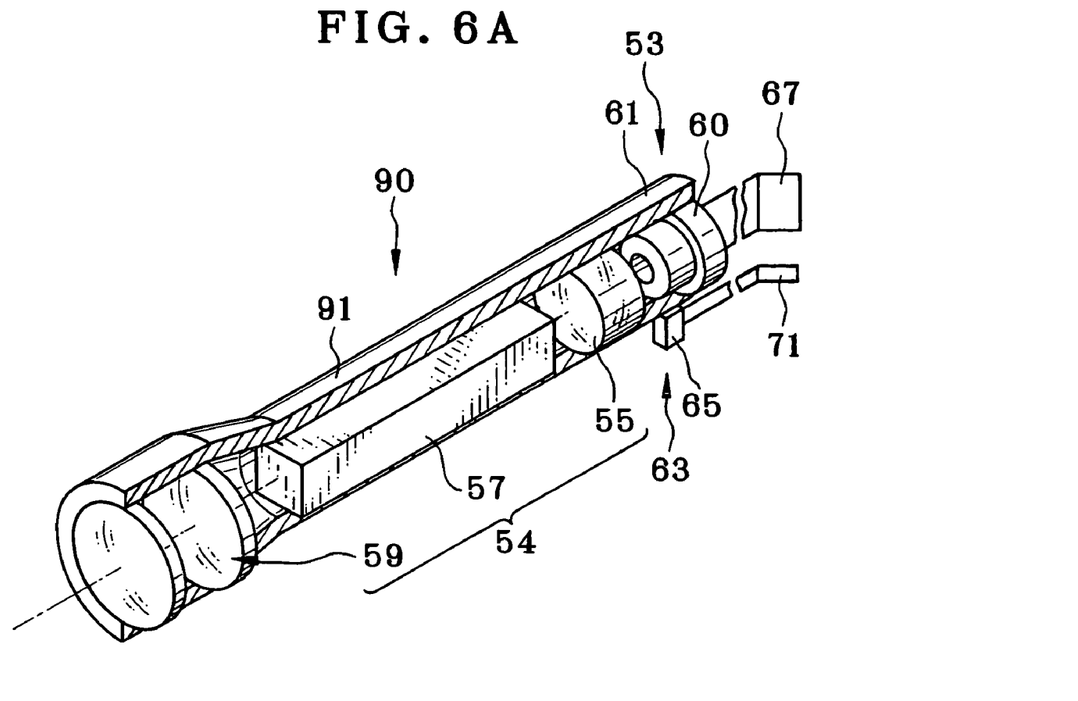
FIGS. 6A and 6B are an exploded perspective and a vertical section illustrating another preferred laser illuminating device of which a light path holder is shaken.
Figure 6B:
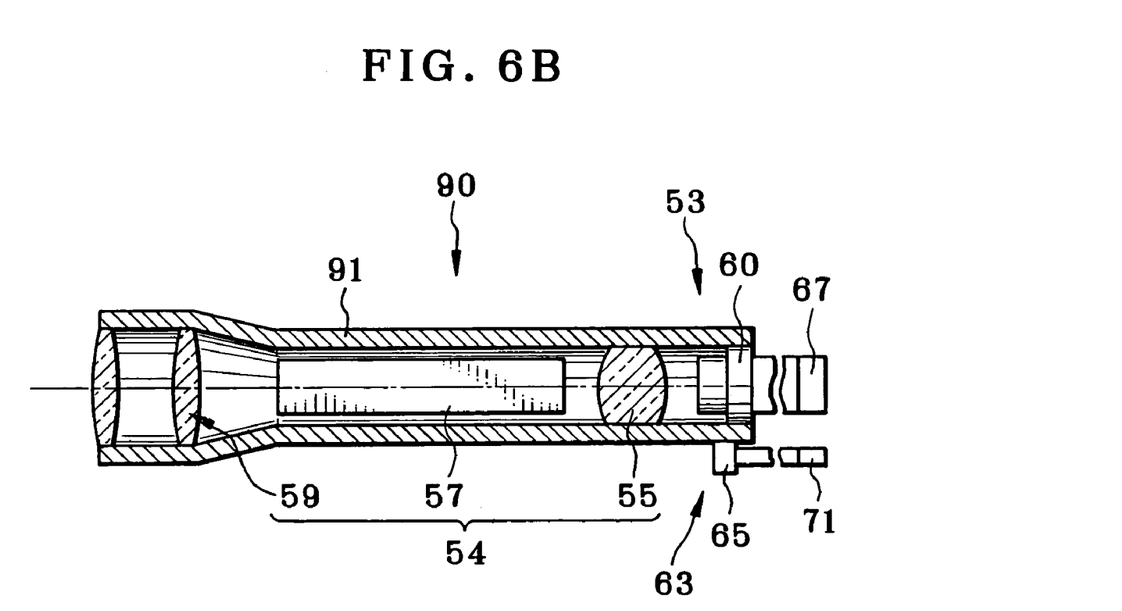

In FIG. 6, another preferred auxiliary or laser illuminating device 90 is illustrated. A light path holder 91 contains all of the laser light source 53, the condensing lens 55, the optical integrator 57 and the relay lens group 59. The shaking device 63 in contact with the light path holder 91 applies vibration to, or shakes the light path holder 91. Note that elements similar to those in FIGS. 5 and 6 are designated with identical reference numerals.

It is to be noted that, in the present specification, shaking stands for repeated mechanical movement within a section having a very small size. Examples of shaking includes oscillating, vibrating, wobbling and the like. In other words, the shaking device may move back and forth, swing back and forth, or rotate on an orbit with a small diameter.

In the above embodiment, the ferroelectric vibrating element is used for shaking or vibration. However, other structures for generating vibration or shaking can be used. For example, a shaking mechanism may have a motor and an eccentric cam of which an output shaft of the motor is secured to the eccentric axis of the cam, to cause vibration by use of rotational shift of the cam.

In the above embodiments, the ultra high pressure mercury lamp 12a is used in the main illuminating device. However, a main illuminating device according to the invention may contain other light sources, such as a metal halide lamp, halogen lamp, LED light source, or the like. Also, an optical system positioned in a path from the main illuminating device 12 to the projecting lens 25 may be a structure other than the above construction.

In the above embodiment, the laser illuminating device 50, 80 and 90 are used to compensate for shortage in the red light by considering the color light of the illuminating light from the main illuminating device 12. However, shortage of light of other colors may be compensated for. Light of colors other than the red color is specifically likely to run short when a change occurs in the type of the main illuminating device 12, or when a change in the light path occurs in one or more optical elements included in the optical system. However, such problems may be solved easily by additionally providing the laser illuminating device 50, 80 and 90 for the purpose of strengthening light of the one or more colors.

In the above embodiment, the LCD panels 11R, 11G and 11B in the liquid crystal projector 1 are constituted by a TFT liquid crystal device. However, any type of liquid crystal device other than the TFT type may be used as light valves. In the above embodiment, the LCD panels 11R, 11G and 11B are the transmission type of liquid crystal display panel. However, a liquid crystal display panel according to the invention may be a reflection type. In the above embodiment, the liquid crystal projector 1 or projection display device is the rear type. However, the liquid crystal projector 1 or projection display device of the invention can be a front type in which an image is projected to a front surface of the screen.

In the above embodiment, the projector is the liquid crystal projector 1. However, a projector according to the invention may be a projector of other types, and can be a DLP (digital light processing) projector in which a display device of DMD (digital micromirror device) is incorporated.

In the above embodiment, the projector is a three-valve type. However, a projector according to the invention may be a single-valve type. Plural examples of single-valve types of projectors are known. One of such examples includes color filters, which assign the primary colors of red, green and blue to pixels. A second one of the examples includes a color wheel, which divides main illuminating light to components of the primary colors in a time-sequential manner. The feature of the present invention can be used effective in any of those plural examples. Note that, if the main illuminating light is divided for each of the primary colors time-sequentially, the laser illuminating device for an auxiliary use may emanate laser light only in synchronism with division for light of one of the primary colors of which the light amount is short. Also, the laser illuminating device can emanate laser light continuously and irrespective of the time sequence of the division for the colors. There will occur no problem in the continuous emanation of the laser light from the laser illuminating device, because the color wheel can shield and cut the light from the laser illuminating device upon division for light of the remainder of the primary colors other than the color of which the light amount is short.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A projector for full-color image projection, comprising:
a light valve device, associated with color components of plural colors, for displaying an image in a color-separated manner;
a main illuminating device for illuminating said light valve device with main illuminating light of said plural colors through illuminating light paths associated with respectively said color components, wherein image light of said plural colors is output by said light valve device, to constitute full-color image light;
a laser illuminating device for emanating auxiliary illuminating light of at least one specific color among said plural colors according to laser emission through one of said illuminating light paths for said specific color, so as to compensate for shortage in light intensity in said main illuminating light;
a shaking device for shaking said laser illuminating device, so as to keep visual noise inconspicuous in said auxiliary illuminating light; and
an auxilliary combining optical element for receiving and combining said main illuminating light from said main illuminating device and said auxiliary illuminating light from said laser illuminating device so as to add said auxiliary illuminating light to said main illuminating light;
wherein
said laser illuminating device includes:
a laser light source for generating laser light;
a laser optical system for regularizing said laser light from said laser light source, to output said auxiliary illuminating light; and
said auxiliary combining optical element receives and combines said main illuminating light of said specific color being separated from other colors of said main illuminating light and said auxiliary illuminating light from said laser illuminating device so as to add said auxiliary illuminating light to said main illuminating light of said specific color, and directs said light being combined to said illuminating light path for said specific color.

2. A projector as defined in claim 1, wherein said shaking device includes:
a vibrating element secured to said laser illuminating device; and
a vibrating circuit for applying voltage to said vibrating element, so as to vibrate said laser illuminating device.

3. A projector as defined in claim 2, wherein said light valve device includes plural liquid crystal display panels;
further comprising a combining optical system for combining said image light of said plural colors from said liquid crystal display panels, to obtain said full-color image light.

4. A projector as defined in claim 2, wherein said shaking device vibrates said laser light source.

5. A projector as defined in claim 4, wherein said laser light source includes a laser diode;
further comprising a laser diode holder, having said shaking device secured thereto, for supporting said laser diode therein.

6. A projector as defined in claim 2, wherein said shaking device vibrates said laser optical system.

7. A projector as defined in claim 6, wherein said laser optical system includes:
a condensing lens for condensing said laser light from said laser light source;
an optical integrator for regularizing said laser light from said condensing lens, to obtain light flux; and
a relay lens for receiving said light flux incident thereon from said optical integrator, and for adjusting an illuminating region thereof, to obtain said auxiliary illuminating light.

8. A projector as defined in claim 7, wherein said shaking device vibrates said relay lens.

9. A projector as defined in claim 2, further comprising a light path holder for containing said laser light source and said laser optical system, wherein said shaking device vibrates said light path holder.

10. A projector as defined in claim 2, wherein said auxiliary combining optical element has wavelength selectivity, reflects said illuminating light of said specific color, and allows passage of said auxiliary illuminating light.

11. A projector as defined in claim 2, wherein said vibrating element is ferroelectric.

12. A projector as defined in claim 11, wherein said vibrating element is produced from material containing at least one of lead titanate and lead zirconate.

13. A projector as defined in claim 2, wherein said main illuminating device includes an ultra high pressure mercury lamp, and said specific color is red.

* * * * *